United States Patent [19]
Henriques

[11] 3,906,448
[45] Sept. 16, 1975

[54] FAULT DETECTION FACILITATING MEANS FOR CARD READER OF IDENTIFICATION CARD READING SYSTEM

[75] Inventor: Frank Fini Henriques, Holte, Denmark

[73] Assignee: RCA Corporation, New York, N.Y.

[22] Filed: Aug. 1, 1974

[21] Appl. No.: 493,896

[52] U.S. Cl. ... 340/149 A; 235/61.6 C; 235/61.11 F
[51] Int. Cl.[2] ......................................... G06K 19/08
[58] Field of Search............ 340/149 A; 237/61.6 C, 237/61.7 R, 61.7 B, 61.11 F

[56] References Cited
UNITED STATES PATENTS

| | | | |
|---|---|---|---|
| 3,602,643 | 8/1971 | Wright, Jr. | 340/149 A X |
| 3,629,834 | 12/1971 | Randall | 340/149 A |
| 3,671,720 | 6/1972 | White et al. | 340/149 A X |

*Primary Examiner*—Donald J. Yusko
*Attorney, Agent, or Firm*—Edward J. Norton; George J. Seligsohn

[57] ABSTRACT

A standard test element bearing predetermined coded information, which is movably mounted to a card reader, is displaced from its home position by the insertion to its operating position in the card reader of a card to be read, but is returned to its home position upon the withdrawal of the card. The standard test element information occupies the operating position of the card reader when in its home position.

6 Claims, 3 Drawing Figures

IDENTIFICATION CARD READING SYSTEM

PATENTED SEP 16 1975　　3,906,448
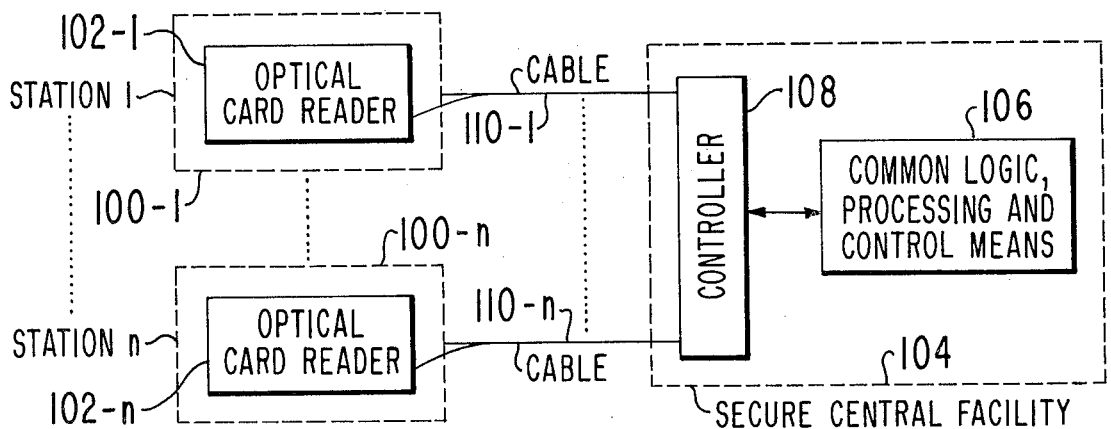
IDENTIFICATION CARD READING SYSTEM
*Fig. 1.*
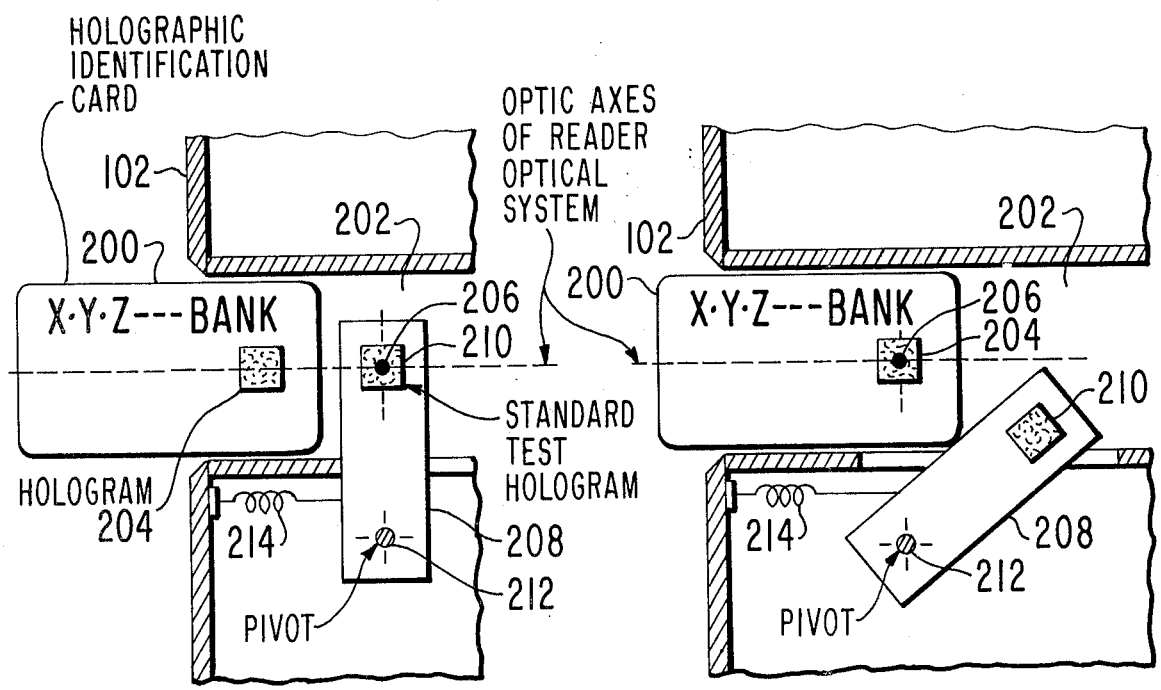
*Fig. 2a.*　　*Fig. 2b.*

FAULT DETECTION FACILITATING MEANS FOR CARD READER OF IDENTIFICATION CARD READING SYSTEM

This invention relates to card readers suitable for use in an identification card reading system and, more particularly, to such a card reader incorporating failure detection facilitating means.

Identification card reading systems have been developed for use in banks, for gaining access to secure areas, and for other such purposes. Such a system usually includes a plurality of identification cards, each normally held by a person to be identified. Each of these identification cards bears specific identifying information in a predetermined coded form. The system further includes one or more card readers to which the card holder himself or an intermediary, such as a bank teller, has direct access. The card readers are normally associated with central processing equipment by appropriate transmission means, such as cables, telephone lines, etc. In order to maintain security of the system, the central processing equipment is normally situated within a secure central facility.

One type of such a system is disclosed in U.S. Pat. No. 3,643,216, issued Feb. 15, 1972 to Greenaway et al. The coded information on each one of the plurality of identification cards employed in the disclosed system of this patent consists of a hologram of a cryptographically encoded varification number. The card reader employed in the disclosed system of this patent is an optical card reader which reads out the hologram and reconstructs the encoded varification number as a binary coded output signal from photodetector means included in the optical card reader. This output signal is decoded and utilized by appropriate digital processing equipment.

The present invention is not limited to optical card readers for a holographic identification card reading system. It may be also employed with optical card readers for reading other types of optically coded identification card information, or, alternatively, the present invention may be employed with other types of card readers for reading non-optical (e.g. magnetic) coded identification card information. However, for illustrative purposes, the present invention will be described in connection with a holographic identification card reading system.

Briefly, the present invention contemplates an improved card reader for an identification card reading system which comprises means including a test card element bearing predetermined standard code information. The element is movably secured to the reader and is situated with respect to a card insertion opening of the reader to be moved from a given home position of the test card element to another position thereof by the insertion of any of a plurality of cards to be read into the opening. Further, the means including the test card element is capable of returning the test card element to its given known position by the withdrawal of an inserted card. When the test card element is in its home position, it is situated at the card-reading operating position of the card reader.

Other features and advantages of the improved card reader of the present invention for use in an identification card reading system will become apparent from the following detailed description taken together with the accompanying drawing, in which:

FIG. 1 is a block diagram of a typical identification card reading system employing a plurality of optical card readers;

FIG. 2a is an illustration of the improved card reader of the present invention with an identification card partially inserted into the insertion opening of the card reader, and FIG. 2b is an illustration of the present invention with an identification card fully inserted in the insertion opening of the card reader.

Referring to FIG. 1, there is shown an illustrative embodiment of an identification card reading system employing card readers of the type which may incorporate the present invention. As shown in FIG. 1, such an identification card reading system may comprise a plurality of separate stations 100-1 . . . 100-n, each of which may be located at a different relatively public location to which a card holder himself or an intermediary, such as a bank teller, has access. An individual one of card readers 102-1 . . . 102-n is respectively included within stations 100-1 . . . 100-n. Although card readers 102-1 . . . 102-n need not necessarily be optical card readers, for illustrative purposes, it will be assumed that card readers 102-1 . . . 102-n are optical card readers of the type which read holographic identification cards. Thus, each of optical card readers 102-1 . . . 102-n may be similar to the card reader disclosed in the aforesaid U.S. Pat. No. 3,643,216.

In a manner discussed in the aforesaid U.S. Pat. No. 3,643,216, each station may include, in addition to its optical card reader, other equipment such as a keyboard for an identification card holder to enter his verifying number, required to be in the public location. However, to maintain security, all information processing should be done at a relatively private secure central facility, rather than out at the station where an optical card reader is located. For this reason, FIG. 1 shows a secure central facility 104 in which common logic, processing and control means 106 and controller 108 are located.

Transmission means, such as cables 110-1 . . . 110-n, individually couple controller 108 and the equipment at each of stations 100-1 . . . 100-n, including the optical card reader thereof.

In the arrangement shown in FIG. 1, controller 108 includes appropriate switching means for associating common logic, processing and control means 106 with the equipment of those ones of stations 100-1 . . . 100-n requesting service, in a manner well known in the telephone switching and other switching art. Further, for use with the present invention, controller 108 includes failure detection means, which may include a printer, for routinely testing card readers 102-1 . . . 102-n at frequent intervals, in such a manner as is described below. The frequent routine testing helps maintain security of the identification card reading system.

Each of FIGS. 2a and 2b shows a portion of card reader 102 which incorporates an embodiment of the present invention together with one of a plurality of holographic identification cards 200. FIG. 2a shows holographic identification card 200 partially entered into insertion opening 202 of card reader 102, so that hologram 204 of card 200 is not yet situated at card reader operating position 206. FIG. 2b shows card 200 fully inserted in insertion opening 202 with hologram 204 situated at operating position 206.

In accordance with this embodiment of the present invention, card reader 102 includes as a permanent part thereof standard test hologram element 208. Standard test hologram 210 is incorporated in element 208, as shown. Further, element 208 is pivotally mounted to card reader 102 at pivot point 212. As shown in FIG. 2a, element 208 is normally maintained in its home position by spring means 214. Standard test hologram 210 is situated at operating point 206 of card reader 102 when element 208 is in its home position. As shown in FIG. 2b, the complete insertion of card 200 into insertion opening 202 is effective in displacing element 208 from its home position and replacing standard test hologram 210 at operating point 206 with hologram 204 of holographic identification card 200. Furthermore, the displacement of element 208 from its home position, as shown in FIG. 2b, results in the stretching of spring means 214, so that element 208 automatically returns to its home position upon the withdrawal of card 200 from insertion opening 202.

Any other mechanical means within the skill of the art for movably mounting the test card may be substituted for the pivotal mounting thereof described above. For instance, the test card may be mounted to slide out of the way when holographic identification card 200 is inserted.

The incorporation of element 208 as a permanent part of each of the card readers 102-1 . . . 102-n of FIG. 1 facilitates the automatic routine testing of each of these card readers. Specifically, a standard test hologram 210 manifests certain unique predetermined coded information, which is known a priori by controller 108. With this known information, controller 108 may routinely test each of optical card readers 102-1 . . . 102-n for failure.

By way of example, a typical routine failure test might consist of controller 108 addressing each of card readers 102-1 . . . 102-10, in turn, every 5 minutes or so. In response to a test signal from controller 108, the light source, which may be a halogen lamp, of any optical card reader under test may be turned up and a reading of the illuminated hologram then at the operating position 206 of that card reader may be processed through the entire system. The following six possibilities exist:

1. None of readers 102-1 . . . 102-n is in use or shows any fault, i.e., the information manifested by standard test hologram 210 is successfully read out for each of the readers 102-1 . . . 102-n in sequence. In this case, a printer incorporated in controller 108 may merely print out the time of the routine test and a check indication that the test was successful.

2. If at the time of the routine test there happens to be a holographic identification card 200 inserted in one or more of the card readers, the printer prints out the information manifested by the hologram 204 of the inserted card 200, together with the time, the address of the reader (which may be built in as wired logic) and indication that the test is successful.

3. If a card reader has failed during the last 5 minutes since the previous test, because of either a lamp burn-out or a fault in the photodetector means of the card reading system, the controller receives no reading of either standard test hologram 210 or the hologram 204 of a holographic identification card 200. However, it does receive the address of the reader being read out. The controller then prints out the time, the address of the faulty reader and an indication that a fault exists therewith.

4. If a reader has a power failure or if the wired logic address in the reader is at fault, the controller receives the addresses of all other readers in the sequence, except the faulty one. The addressing unit in the controller notices this and prints out information similar to that discussed in paragraph 3 above.

5. If the controller itself is faulty, the printer does not receive the 5 minute check, and a simple parity circuit detects this and makes the printer print a message indicating this condition.

6. If the controller fails to get a printer response a light and/or acoustic alarm is actuated.

Thus, it is the inclusion of element 208 with its standard test hologram 210, in each of card readers 102-1 . . . 102-n which, at very low cost, facilitates the automatic routine testing at frequency intervals of the card readers for faults. Thus, the security of an identification card reading system employing card readers incorporating the present invention is maintained.

What is claimed is:

1. A card reader having a card insertion opening; said card reader being suitable for use in a system including at least one card reader for reading any of a plurality of cards bearing coded information corresponding to that card when that card is inserted in said opening and situated at an operating position thereof; said card reader deriving an output signal manifesting the coded information borne by a card situated at said operating position, said system further including processing means coupled to said reader and having said output signal therefrom applied thereto for processing the information manifested by said output signal; the improvement in said card reader comprising:

means including a test card element bearing predetermined standard coded information, said element being movably secured to said reader and being situated with respect to said opening to be moved from a given home position thereof to another position thereof by the insertion of any of said plurality of cards into said opening and to be returned to said given home position thereof by the withdrawal of that inserted card, and wherein said test-card element when in its home position is situated at the operating positions of said opening.

2. The card reader defined in claim 1, wherein said test card element is a permanent part of said card reader.

3. The card reader defined in claim 1, wherein said test card element is pivotally mounted at a first point thereof to a pivot point at a predetermined position on said card which pivot point is in given spaced relationship with respect to said operating position, said test card element when in its home position extending from its first point into said insertion opening with the placement of the coded information thereon substantially occupying said operating position, and wherein said predetermined position of said pivot point is situated to permit an inserted one of said plurality of cards to engage said test card element at a portion thereof remote from said first point thereof and rotate said test card element about said pivot point away from its home position.

4. The card reader defined in claim 3, further including a spring means coupled to test card element for restoring said test card element to its home position in response to the withdrawal of an inserted one of said plurality of cards.

5. The card reader defined in claim 1, wherein said card reader, said optical card reader and said coded information is optically coded information.

6. The code reader defined in claim 5, wherein said optical card reader is a holographic card reader and wherein said optically coded information is holographically coded information.

* * * * *